United States Patent [19]

Bost

[11] 4,115,349

[45] Sep. 19, 1978

[54] TRIPHENYLPHOSPHINE OXIDE AS A PROMOTER FOR PHOSPHORUS-CONTAINING FLAME RETARDANT

[75] Inventor: Howard W. Bost, Bartlesville, Okla.

[73] Assignee: Phillips Petroleum Company, Bartlesville, Okla.

[21] Appl. No.: 821,375

[22] Filed: Aug. 3, 1977

[51] Int. Cl.² .......................... C08K 5/34; C08K 5/51; C08K 5/53
[52] U.S. Cl. .............................. 260/45.8 NT; 252/8.1; 260/45.7 P; 260/45.95 P; 260/880 R
[58] Field of Search ................... 260/45.9 NP, 45.7 P, 260/45.8 NT

[56] References Cited

U.S. PATENT DOCUMENTS

| | | | |
|---|---|---|---|
| 3,332,889 | 7/1967 | Epstein et al. | 260/45.9 NP |
| 3,341,625 | 9/1967 | Currier et al. | 260/45.7 P |
| 3,629,365 | 12/1971 | Gardner | 260/45.7 P |
| 3,663,502 | 5/1972 | Murray et al. | 260/45.9 NP |
| 3,681,281 | 8/1972 | Juelke et al. | 260/45.7 P |
| 3,888,930 | 6/1975 | Kleiner et al. | 260/45.7 P |
| 3,895,074 | 7/1975 | Mrowca | 260/45.7 P |
| 3,931,104 | 1/1976 | Luders et al. | 260/45.7 P |
| 4,010,137 | 3/1977 | Brady | 260/45.8 NT |
| 4,026,810 | 5/1977 | Bost | 260/45.9 NP |
| 4,043,975 | 8/1977 | Bost | 260/45.8 NT |
| 4,072,643 | 2/1978 | Bost | 260/45.8 NT |

Primary Examiner—Donald E. Czaja
Assistant Examiner—R. A. White

[57] ABSTRACT

The flame resistance of synthetic resin compositions containing certain phosphorus-containing flame retardants is enhanced by incorporating in said compositions a suitable amount of triphenylphosphine oxide.

24 Claims, No Drawings

TRIPHENYLPHOSPHINE OXIDE AS A PROMOTER FOR PHOSPHORUS-CONTAINING FLAME RETARDANT

This invention relates to flame retardants. In another aspect this invention relates to flame-resistant synthetic resin compositions.

U.S. Pat. Nos. 3,936,416 and 4,010,137, the disclosures of which are incorporated herein by reference, disclose the preparation of certain phosphorus-containing flame retardants for synthetic resins. While additives of that type are quite capable of imparting various degrees of flame resistance to synthetic resins, it is sometimes necessary, in order to attain certain levels of flame resistance, to employ loadings of the phosphorus-containing additive which adversely affect other physical properties of the synthetic resin. For example, high loadings of the phosphorus-containing flame retardant can so affect the tensile strength and the brittleness of a synthetic resin that the flame-resistant resin would not be satisfactory for certain applications. Accordingly, it is desirable to enhance the effectiveness of such phosphorus-containing flame retardants so that the loading of additives in the synthetic resin composition can be lowered without also lowering the flame resistance of the synthetic resin composition.

Therefore, an object of this invention is to provide a composition in which an additive is employed to lower the amount of phosphorus-containing retardant that is necessary to provide a given level of flame resistance to a synthetic resin composition.

Another object of this invention is to provide an improved phosphorus-containing flame-retardant composition.

According to the present invention, a flame retardant is provided comprising a phosphorus-containing flame retardant and triphenylphosphine oxide. Also the present invention provides flame-resistant synthetic resin compositions comprising (1) at least one synthetic resin, (2) a phosphorus-containing flame retardant, and (3) triphenylphosphine oxide.

Examples of synthetic resins that can be rendered flame-retardant with the phosphorus-containing additives of this invention include olefin homopolymers, olefin copolymers, acrylonitrile-butadiene-styrene resins, and polystyrene resins, and blends thereof. The inventive flame retardants are particularly well suited for normally solid molding grade resins.

Examples of normally solid polyolefins suitable for use in this invention include polymers of mono-alpha-olefins having the general formula $CH_2=CHR$ wherein R represents hydrogen or a hydrocarbyl radical, for example, an aryl radical or an alkyl radical or combinations thereof such as alkaryl and aralkyl, having up to a total of 10 carbon atoms in each R group. Typical polymers are the homopolymers and copolymers of ethylene, propylene, butene-1 isobutylene, pentene-1, styrene, and dimethylstyrene. Such polymers can be prepared by any suitable process known in the art which produces a normally solid polyolefin. When propylene copolymers are used, such as propylene/ethylene copolymers, the ethylene comonomer is generally present in amounts ranging from about 2 to about 25 weight percent of said copolymer, and preferably the ethylene comonomer is present from about 5 to about 15 weight percent of said copolymer.

The phosphorus-containing flame retardant employed in this invention is the product which results when suitable amounts of (1) at least one phosphorus oxide compound of the formula $(P_2O_5)_{0.5-1.0}(H_2O)_{0.0-1.5}$, (2) melamine, and (3) at least one saturated open-chain polyol containing from 5 to 15 carbon atoms and from 4 to 8 hydroxyl groups are combined and heated prior to incorporation into a synthetic resin composition under such conditions that the product will not cause significant foaming of the synthetic resin composition when the synthetic resin composition is subsequently subjected to molding conditions.

In general the heating required to produce the phosphorus-containing flame retardant as described in the preceding paragraph will be conducted at a temperature in the range of about 100° to about 300° C. for about 1 to about 25 hours.

Any amounts of the three above-named ingredients can be employed which will result in a product having flame resistance. Generally, it is considered that flame resistance will be provided if 1 to 100 parts by weight of each of the three above-named ingredients is employed in preparing the phosphorus-containing flame retardant where all parts by weight are on the same weight basis. Examples of such phosphorus-containing flame retardants include the following: (1) the reaction product of melamine pyrophosphate and dipentaerythritol; (2) the reaction product of phosphoric acid, urea, malamine, and at least one of pentaerythritol, dipentaerythritol, and tripentaerythritol; (3) the reaction product of phosphoric acid, phosphorus pentoxide, melamine, and at least one of pentaerythritol, dipentaerythritol, and tripentaerythritol; and (4) the reaction product of a condensed phosphoric acid, melamine, and at least one of pentaerythritol, dipentaerythritol, and tripentaerythritol.

Phosphorus oxide compounds of the formula $(P_2O_5)_{0.5(1.0}(H_2O)_{0.0(1.5}$ include, for example, phosphorus pentoxide, orthophosphoric acid, and condensed phosphoric acids. A condensed phosphoric acid is a phosphoric acid containing any quantity of one or more polyphosphoric acids and/or metaphosphoric acids. Any such acid can be employed in this invention. The polyphosphoric acids include the dimeric pyrophosphoric acid and other entities such as the trimer through the nonamer and even more highly condensed species. The properties and compositions of the condensed phosphoric acids vary with the $P_2O_5$ content of the condensed phosphoric acid as discussed in Bell, "Composition of Strong Phosphoric Acids," *Industrial and Engineering Chemistry*, 40, 1464–1467 (1948). Although any condensed phosphoric acid having from about 70 to about 100 weight percent $P_2O_5$ can be employed; or, more preferably, the condensed phosphoric acid employed contains about 80 to about 90 weight percent $P_2O_5$. Such condensed phosphoric acids may be prepared by any technique known by those skilled in this area.

The saturated open-chain polyols employed in preparing the phosphorus-containing flame retardant contain from 5 to 15 carbon atoms and from 4 to 8 hydroxyl groups per molecule. Preferably, in addition to C, H, and hydroxyl groups, the only other functional groups in the polyols are a maximum of two ether linkages per molecule. Examples of suitable polyols include, sorbitol, mannitol, pentaerythritol, dipentaerythritol, and tripentaerythritol, and mixtures of any two or more thereof.

Also in preparing the phosphorus-containing flame retardant, minor amounts of other materials can be added to improve its color, physical handling properties, and the like.

As indicated above, one example of a phosphorus-containing flame retardant is the reaction product of melamine pyrophosphate and at least one polyol selected from pentaerythritol, dipentaerythritol, and tripentaerythritol. The melamine pyrophosphate and polyol are combined in proportions that will impart flame resistance to a synthetic resin. In general, the weight ratio of melamine pyrophosphate to polyol will be in the range of about 14:1 to about 0.2:1, or more preferably from about 4:1 to about 1:1. Generally the polyol and melamine pyrophosphate are heated at a temperature in the range of about 175° C. to about 275° C. until the foaming has substantially subsided.

Another phosphorus-containing flame retardant mentioned above is the reaction product of orthophosphoric acid, urea, melamine, and at least one polyol selected from pentaerythritol, dipentaerythritol, and tripentaerythritol. Although the reactants can be employed in any proportions that will impart flame resistance, generally there is employed from about 30 to about 100 parts by weight of orthophosphoric acid, about 40 to about 125 parts by weight of urea, about 3 to about 90 parts by weight of melamine, and about 5 to about 90 parts by weight of polyol, where all parts by weight are on the same weight basis. Within this general range the preferred amounts of reactants to be employed are about 60 to about 80 parts by weight orthophosphoric acid, about 75 to about 95 parts by weight urea, about 5 to about 70 parts by weight melamine, and about 10 to about 40 parts by weight polyol.

The reactants, viz, orthophosphoric acid, urea, polyol, and melamine can be simultaneously reacted. Alternatively, the orthophosphoric acid and the urea can be combined and then polyol added to provide a mixture which is heated until substantially all the esterification of the phosphoric acid has taken place, to yield a solid esterification product. This esterification product is combined with the malamine and then the resulting mixture is subjected to heating which will insure that the flame retardant when incorporated into a synthetic resin will not cause significant foaming when the synthetic resin is subjected to molding conditions, but will impart flame resistance to said synthetic resin. Another alternative involves combining the phosphoric acid and polyol, then adding the urea and heating the mixture until substantially all the esterification has taken place to yield a solid esterification product; then the melamine is combined with the esterification product and the admixture is subjected to degassing, as in the previously described method. Generally, when this method or the immediately preceding described method is employed for preparing the inventive flame retardant, the weight ratio of the esterification product to melamine is in the range of about 10:1 to about 1:2, or preferably, in the range of about 6:1 to about 1:2.

In preparing the flame retardant from urea, phosphoric acid, polyol, and melamine, the temperatures found satisfactory for degassing the retardant are generally in the range of about 190° to about 280° C. The time required for degassing is generally in the range of from about 0.5 to about 4 hours. The esterification generally requires heating for several hours at a temperature of at least about 100° C.

A phosphorus-containing flame retardant suitable for being employed in this invention can also be prepared by combining polyphosphoric acid (or a mixture of phosphorus pentoxide and orthophosphoric acid) with melamine and polyol. Generally, this type of phosphorus-containing flame retardant is prepared by slowly adding to the condensed polyphosphoric acid (or mixture of phosphorus pentoxide and orthophosphoric acid) the polyol in admixture with about 5 to about 15 weight percent of the melamine, with stirring, with the temperature being in the range of about 75° to about 150° C., more usually about 110° to about 130° C., for about 0.5 to about 8 hours, more usually about 0.5 to about 4 hours. With the temperature being in the range of about 120° to about 300° C., usually about 150° to about 250° C., the remainder of the melamine is added over the course of about 0.1 to about 5 hours, usually about 0.5 to about 3 hours. Further reaction, curing, and degassing is carried out by continued heating with the temperature being in the range of about 150° to 300° C., usually about 240° to about 270° C. for about 1 to about 10 hours, usually about 2 to about 5 hours. The reaction product is then generally cooled and pulverized to a suitable particle size for convenient incorporation into a thermoplastic polymer. Preferably, during the preparation, whenever the temperature is above room temperature, a nonoxidative atmosphere is employed.

When preparing such phosphorus-containing flame retardants from orthophosphoric acid, phosphorus pentoxide, polyol, and melamine, the parts by weight of each of those ingredients per hundred parts by weight of the total of those ingredients is generally in the range of 0.5–25, 10–75, 5–30 and 10–70, respectively, and preferably in the range of 5–15, 15–50, 10–25, and 15–50, respectively. It is especially preferred that the orthophosphoric acid, phosphorus pentoxide, melamine, and polyol be employed in amounts such that the respective molar ratio of the ingredients is in the range of 0.5–1.5:2–3:2–3:0.5–2.5.

When preparing such phosphorus-containing flame retardants from condensed phosphoric acid, melamine, and polyol, the parts by weight of each of those ingredients per hundred parts by weight of the total of those ingredients is generally in the range of 25–75, 10–70, and 5–50, respectively, and preferably in the range of 30–60, 25–50, and 10–40, respectively.

Regardless of the method chosen for preparation, generally after the phosphorus-containing flame retardant is prepared, it is allowed to cool to form a solid and is then pulverized to a form that is easily compounded into a synthetic resin.

In the present invention the phosphorus-containing flame retardant is added to the synthetic resin in an amount that alone would be insufficient to provide a flame resistance rating of V-O according to a Modified U.L.-94 flame test that will be now described. Underwriters Laboratory has developed a vertical burning test which is set forth in Underwriters Laboratory Bulletin 94 and is for this reason denoted as the U.L.-94 vertical burning test. A complete discussion of the U.L.-94 test procedure is provided in the article beginning on page 92 of the October 1970 issue of *Modern Plastics*. In developing the present invention, a Modified U.L.-94 test was employed. The Modified U.L.-94 test involved the use of 5 × ½ × ⅛ inch test specimens. The test specimens were held vertically and ignited on their lower ends with a standard U.L.-94 test flame for 10 seconds. The flame was then removed and the length of time for continued burning was measured. If the burning subsided within 30 seconds after flame removal, the flame was immediately applied again for 10 seconds.

The flame was then removed and the length of time of continued burning measured again. Then the flame was applied to the sample one final time for 10 seconds. The average burning time of the three burns was noted. If the average burning was greater than 25 seconds, it was classified as "fail." If the average burning time was less than 25 seconds but flaming particles or drops were released, the composition was classed as V-II. If the average burning time was less than 25 seconds and no flaming particles or drops released, the composition was classed as V-I. If the average burning time was 5 seconds or less and no flaming paricles or drops were released during this time, the composition was classified as V-O. Since a V-O flame resistance rating according to the Modified U.L.-94 test disclosed herein is satisfactory for most applications and since an object of this invention is to reduce the loading of flame retardants in the synthetic resin, the compositions of this invention are limited to those which contain an amount of said phosphorus-containing flame retardant that alone is insufficient to provide the composition with a V-O flame rating according to the Modified U.L.-94 test disclosed herein. Generally, the amount of phosphorus-containing flame retardant which is insufficient to provide a flame rating of V-O will be less than 75 php or more often less than about 40 php. (The term "php" is used herein to indicate parts by weight of an ingredient per hundred parts by weight of synthetic resin.)

In accordance with the present invention, the amount of triphenylphosphine oxide employed with said phosphorus-containing flame retardant is that sufficient to enhance the flame resistance provided by the phosphorus-containing flame retardant. Generally, the amount of triphenylphosphine oxide amounts to no more than about 65 weight percent, preferably not more than about 30 weight percent, based on the weight of the phosphorus-containing flame retardant. It is especially preferred if the amount of triphenylphosphine oxide is in the range of about 20 to about 30 weight percent of the phosphorus-containing flame retardant.

Generally, in synthetic resins the phosphorus-containing flame retardant is employed in an amount in the range of about 15 to about 65 php. In that range an enhancing amount of triphenylphosphine oxide will be in the range of about 2 to about 10 php. Preferably the phosphorus-containing flame retardant is employed in an amount in the range of about 22.5 to about 40 php and the triphenylphosphine oxide is employed in an amount in the range of about 5 to about 7.5 php.

The synthetic resin compositions of the present invention can also include additives generally employed in polyolefin compositions, such as pigments and antioxidants. Of course, the amounts and types of other additives employed will depend upon the properties desired in the resulting polyolefin compositions.

In preparing the synthetic resin compositions of the present invention, any suitable procedure can be used for incorporating the various additives into the synthetic resin. Usually the synthetic resin is heated to a temperature above its melting point and the various additives are dispersed therein, in any order, by milling or other suitable means until a uniform dispersion is obtained. Thereafter, the flame-resistant synthetic resin composition is extruded, granulated, or formed into articles of manufacture as desired.

It is often desirable to prepare a premix of the phosphorus-containing flame retardant and the triphenylphosphine oxide for mixing with the synthetic resin. It is also without the scope of this invention to provide the triphenylphosphine oxide by including it in the ingredients used in preparing the phosphorus-containing flame retardant.

The present invention will be further illustrated by the following examples. In the examples the term PCFR refers to the phosphorus-containing flame retardant.

The various phosphorus-containing flame retardants employed in the following examples were prepared by mixing phosphorus pentoxide and phosphoric acid with pentaerythritol and a portion of the total amount of melamine with heating, then adding the remainder of the melamine with additional heating. In preparing some of the PCFR's some octadecanol was employed along with the melamine. Octadecanol serves as a color stabilizer.

The ingredients and amounts employed in preparing the PCFR's used in the following examples are as shown in Table I.

TABLE I

| PCFR No. | PCFR Preparations | | | |
|---|---|---|---|---|
| | $P_2O_5$, 85% $H_3PO_4$, g | Pentaerythritol, g | Melamine, g | Other, g |
| 1 | 47 | 15.5 | 27.2 | 50.5 | None |
| 2 | 47 | 15.5 | 27.2 | 50.5 | None |
| 3 | 94 | 31 | 54.4 | 101 | None |
| 4 | 94 | 31 | 54.4 | 101 | None |
| 5 | 141 | 46.5 | 76.1 | 151.5 | Octadecanol, 45 |
| 6 | 141 | 46.5 | 79.7 | 151.5 | Octadecanol, 15 |
| 7 | 141 | 46.5 | 79.7 | 151.5 | Octadecanol, 15 |
| 8 | 141 | 46.5 | 79.7 | 151.5 | Octadecanol, 15 |

EXAMPLE I

Four runs were carried out in which triphenylphosphine oxide alone was utilized in polypropylene. The polypropylene utilized was in fluff form and contained an antioxidant system of Irganox 1010 (0.09%), distearyl thiobispropionate (0.25%), butylated hydroxytoluene (0.07%), dioctyl phosphite (0.07%), and calcium stearate (0.10%). In runs 2, 3 and 4, an internal mixer was utilized to mix the triphenylphosphine oxide with the polypropylene while in run 1 the triphenylphosphine oxide was added by mixing on a steam-heated roll mill. The runs of this example utilized differing levels of the triphenylphosphine oxide additive. The amounts of the additive utilized and the results obtained in the modified U.L.-94 test are presented below in Table II.

TABLE II

| Run No. | TPPO[a] php | Rating Result U.L.-94 Test |
|---|---|---|
| 1 | 7.5 | Fail |
| 2 | 20 | Fail |
| 3 | 30 | Fail |
| 4 | 40 | Fail |

[a]TPPO = Triphenylphosphine oxide.

The results shown in Table II demonstrate that the triphenylphosphine oxide alone is completely ineffective in levels ranging from 7.5 php up to 40 php as an additive for flame-retarding polypropylene.

EXAMPLE II

Another series of runs were carried out utilizing polypropylene fluff as the polymer and the PCFR's prepared as previously described. The polypropylene fluff containing the antioxidant system described in Example I and the PCFR were mill-mixed to provide the compositions evaluated. In this series of runs, the amount of the PCFR was varied in a manner similar to that described for the runs of Example I. The compositions thus obtained were tested using the modified U.L.-94 test described previously. The amounts of the PCFR utilized in the runs of this example and the results obtained in the modified U.L.-94 test are presented below in Table III.

TABLE III

| Run No. | PCFR No. | php | Rating Result U.L.-94 Test |
|---|---|---|---|
| 5 | 1 | 22.5 | V-II |
| 6 | 1 | 30 | V-II |
| 7 | 1 | 37.5 | V-I |
| 8 | 2 | 40 | V-O |
| 9 | 2 | 45 | V-O |
| 10 | 1 | 52.5 | V-O |

The results shown in the table above demonstrate that about 40 php of PCFR is required in order to give a V-O rating in the modified U.L.-94 test. It is evident that lower levels do provide some flame-retardant benefit when present in the polypropylene composition, i.e., they show modified U.L.-94 test results ranging from V-I to V-II rather than a "fail" result which was obtained in the runs of Example I.

EXAMPLE III

The runs of this example were carried out according to the instant invention wherein polypropylene fluff containing the antioxidant system described above was mill-mixed with triphenylphosphine oxide and PCFR to provide a flame-retardant system which was effective in providing a V-O rating in the Modified U.L.-94 test at a total loading about 20% lower than that shown for the system utilizing PCFR alone. The amounts of the PCFR and tripehnylphosphine oxide utilized in the runs of this example as well as the results obtained in the modified U.L.-94 test are presented below in Table IV.

TABLE IV

| Run No. | PCFR No. | php | TPPO php | Rating Result U.L.-94 Test |
|---|---|---|---|---|
| 11 | 3 | 22.5 | 5.0 | V-II |
| 12 | 4 | 25.0 | 5.0 | V-O |
| 13 | 3 | 25.0 | 5.0 | V-O |
| 14 | 3 | 22.5 | 7.5 | V-O |
| 15 | 5 | 22.5 | 7.5 | V-O |
| 16 | 3 | 26.2 | 7.5 | V-O |

As can be seen by the results for runs 13, 14 and 15, a total loading of the inventive flame-retardant system of 30 php provides a composition with a V-O rating in the modified U.L.-94 test. It can be noted that run 8 of Example II utilizing 40 php of PCFR provided a V-O rating in said test. As indicated above, the runs of this invention thus do provide a 20% reduction in the total loading of the flame retardant necessary to achieve the V-O rating. Such a result will have desirable effects on the physical properties of polymer compositions utilizing the flame-retardant system of the instant invention. The poorer result shown for run 12 of Table IV as compared to the result for run 13 is believed to be due to a less than thorough mixing of the flame-retardant system in the polypropylene composition of run 12. Experience has indicated that poor mixing sometimes provides spurious and inferior results in compositions undergoing the modified U.L.-94 test.

EXAMPLE IV

Additional runs were carried out which utilized a blend of polymers rather than polypropylene in the flame retardant tests. Said blends utilized in the runs of this example were made up of 40 or 45% by weight polypropylene, 35 or 30% by weight of polyethylene and 25% by weight of a commercially available ethylene-propylene rubber (Vistalon 606). Run 17 of this series of runs was the sole run utilizing 40% by weight of polypropylene and 35% by weight of polyethylene. All of the other runs utilized 45% by weight of the polypropylene and 30% by weight of polyethylene. Runs 17, 18 and 19 were carried out utilizing only the PCFR as the flame-retardant additive while runs 20, 21 and 22 utilized the combination of the instant invention, i.e., triphenylphosphine oxide with the PCFR. The polymer blends were admixed with the flame-retardant additives on a steam-heated roll mill and the samples compression-molded to provide suitable specimens for use in the modified U.L.-94 test. The levels of flame-retardant additives utilized in these runs, as well as the results obtained in the modified U.L.-94 test, are presented in Table V below.

TABLE V

| Run No. | PCFR No. | php | TPPO php | Rating Result U.L.-94 Test |
|---|---|---|---|---|
| 17 | 6 | 40 | 0 | V-I |
| 18 | 7 | 40 | 0 | V-I |
| 19 | 6 | 50 | 0 | V-O |
| 20 | 8 | 35 | 3 | Fail |
| 21 | 8 | 30 | 5 | Fail |
| 22 | 8 | 35 | 5 | V-O |

The results for runs 18 and 19 indicate that somewhere between 40 and 50 php of PCFR alone is required to achieve a V-O rating in the modified U.L.-94 test. Run 22 indicates that when a combination of PCFR and triphenylphosphine oxide is used, a V-O rating can be obtained with only 40 php of addition. These results indicate that a reduction in total loading of the flame retardant system for polymer blends can be achieved according to the instant invention utilizing a combination of triphenylphosphine oxide and the phosphorus-containing flame retardant.

What is claimed is:

1. A flame-resistant synthetic resin composition comprising (1) at least one synthetic resin, (2) a phosphorus-containing flame retardant comprising the reaction product of (a) at least one phosphorus oxide compound of the formula $(P_2O_5)_{0.5-1.0}(H_2O)_{0.0-1.5}$, (b) melamine, and (c) at least one saturated open-chain polyol containing from 5 to 15 carbon atoms and from 4 to 8 hydroxyl groups per molecule, which reaction product has been heated prior to incorporation into said synthetic resin composition under such conditions that said reaction product will not cause significant foaming of said synthetic resin composition when said synthetic resin composition is subjected to molding conditions; and (3) triphenylphosphine oxide, wherein said phosphorus-containing flame retardant is present in an amount that alone would be insufficient to impart to said synthetic resin composition a flame resistance rating of V-O according to the modified U.L.-94 test and wherein said triphenylphosphine oxide is present in an amount which enhances the flame resistance provided by the phosphorus-containing flame retardant.

2. A flame-resistant synthetic resin composition comprising (1) at least one synthetic resin selected from the group of homopolymers and copolymers of mono-alpha-olefins having the general formula $CH_2=CHR$ wherein R represents hydrogen or a hydrocarbyl radical having from 1 to 10 carbon atoms, (2) a phosphorus-containing flame retardant comprising the reaction product of (a) at least one phosphorus oxide compound of the formula $(P_2O_5)_{0.5-1.0}(H_2O)_{0.0-1.5}$, (b) melamine, and (c) at least one saturated open-chain polyol containing from 5 to 15 carbon atoms and from 4 to 8 hydroxyl groups per molecule, which reaction product has been heated prior to incorporation into said synthetic resin composition under such conditions that said reaction product will not cause significant foaming of said synthetic resin composition when said synthetic resin composition is subjected to molding conditions; and (3) triphenylphosphine oxide, wherein said phosphorus-containing flame retardant is present in an amount that alone would be insufficient to impart to said synthetic resin composition a flame resistance rating of V-O according to the modified U.L.-94 test and wherein said triphenylphosphine oxide is present in an amount which enhances the flame resistance provided by the phosphorus-containing flame retardant.

3. A flame-resistant composition according to claim 2 wherein the amount of said phosphorus-containing flame retardant is in the range of about 15 to about 65 parts by weight per hundred parts by weight of polyolefin and the amount of triphenylphosphine oxide is in the range of about 2 to about 10 parts by weight per hundred parts by weight of polyolefin.

4. A flame-resistant composition according to claim 3 wherein the phosphorus-containing flame retardant is prepared from about 1 to about 100 parts by weight of each of said phosphorus oxide compound, said melamine, and said polyol.

5. A flame-resistant composition according to claim 4 wherein the phosphorus-containing flame retardant is prepared from orthophosphoric acid, phosphorus pentoxide, melamine, and at least one of said polyols.

6. A flame-resistant composition according to claim 5 wherein the parts by weight of each ingredient employed in preparing the phosphorus-containing flame retardant per hundred parts by weight of the total of said ingredients fall within the following ranges:
orthophosphoric acid: 0.5–25
phosphorus pentoxide: 10–75
polyol: 5–30
melamine: 10–70.

7. A flame-resistant composition according to claim 6 wherein each of said at least one polyol is selected from the group consisting of pentaerythritol, dipentaerythritol, and tripentaerythritol.

8. A flame-resistant composition according to claim 7 wherein the amounts of said orthophosphoric acid, said phosphorus pentoxide, said melamine, and said polyol employed in preparing the phosphorus-containing flame retardant are such that the respective molar ratio of the ingredients is in the range of 0.5–1.5:2–3:2–3:0.5–2.5.

9. A flame-resistant composition according to claim 7 wherein the amount of phosphorus-containing flame retardant present is in the range of about 22.5 to about 40 parts by weight per hundred parts by weight of polyolefin and the amount of triphenylphosphine oxide is in the range of about 5 to about 7.5 parts by weight per hundred parts by weight of polyolefin.

10. A flame-resistant composition according to claim 9 wherein said polyolefin is polypropylene.

11. A flame-resistant composition according to claim 4 wherein the phosphorus-containing flame retardant is prepared from condensed phosphoric acid, melamine and at least one of said polyols.

12. A flame-retardant composition according to claim 11 wherein the parts by weight of each ingredient employed in preparing the phosphorus-containing flame retardant per hundred parts by weight of the total of said ingredients fall within the following ranges:
condensed phosphoric acid: 25–75
melamine: 10–70
polyol: 5–50

13. A flame-resistant composition according to claim 12 wherein each of said at least one polyol is selected from the group consisting of pentaerythritol, dipentaerythritol, and tripentaerythritol.

14. A flame-resistant composition according to claim 13 wherein the amount of said phosphorus-containing flame retardant present is in the range of about 15 to about 40 php and the amount of said triphenylphosphine oxide is in the range of about 0.5 to about 8 php.

15. A flame retardant comprising (1) a phosphorus containing flame retardant comprising the reaction product which results when (a) at least one phosphorus oxide compound of the formula $(P_2O_5)_{0.5-1.0}(H_2O)_{0.0-1.5}$ (b) melamine, and (c) at least one saturated open-chain polyol containing from 5 to 15 carbon atoms and from 4 to 8 hydroxyl groups are combined and heated under such conditions that when said product is incorporated into a synthetic resin in an amount sufficient to impart flame retardance, said product will not cause significant foaming of the synthetic resin composition when said composition is subjected to molding conditions, and (2) up to about 65 weight percent of triphenylphosphine oxide based upon the weight of said phosphorus-containing flame retardant.

16. A flame retardant according to claim 15 wherein the triphenylphosphine oxide is present in an amount of up to about 30 weight percent of the phosphorus-containing flame retardant.

17. A flame retardant according to claim 16 wherein the triphenylphosphine oxide is present in an amount in the range of about 20 to about 30 weight percent of the phosphorus-containing flame retardant.

18. A flame retardant according to claim 15 prepared by including said triphenylphosphine oxide in the ingredients used in making the phosphorus-containing flame retardant.

19. A method for preparing a flame retardant synthetic resin composition comprising admixing (1) at least one synthetic resin, (2) a phosphorus-containing flame retardant comprising the reaction product of (a) at least one phosphorus oxide compound of the formula $(P_2O_5)_{0.5-1.0}(H_2O)_{0.0-1.5}$, (b) melamine, and (c) at least one saturated open-chain polyol containing from 5 to 15 carbon atoms and from 4 to 8 hydroxyl groups per molecule, which reaction product has been heated prior to incorporation into said at least one synthetic resin composition under such conditions that said reaction product will not cause significant foaming of said synthetic resin composition when said synthetic resin composition is subjected to molding conditions, and (3) triphenylphosphine oxide, wherein said phosphorus-containing flame retardant is employed in an amount that alone would be insufficient to impart to said synthetic resin composition a flame resistance rating of V-O according to the modified U.L.-94 test and wherein said triphenylphosphine oxide is employed in in amount which enhances the flame resistance provided by the phosphorus-containing flame retardant.

20. A method for preparing a flame retardant synthetic resin composition comprising admixing (1) at least one synthetic resin selected from the group of homopolymers and copolymers of mono-alpha-olefins having the general formula $CH_2=CHR$ wherein R represents hydrogen or a hydrocarbyl radical having from 1 to 10 carbon atoms, (2) a phorphorus-containing flame retardant comprising the reaction product of (a) at least one phosphorus oxide compound of the formula $(P_2O_5)_{0.5-1.0}(H_2O)_{0.0-1.5}$, (b) melamine, and (c) at least one saturated open-chain polyol containing from 5 to 15 carbon atoms and from 4 to 8 hydroxyl groups per molecule, which reaction product has been heated prior to incorporation into said at least one synthetic resin composition under such conditions that said reaction product will not cause significant foaming of said synthetic resin composition when said synthetic resin composition is subjected to molding conditions, and (3) triphenylphosphine oxide, wherein said phosphorus-containing flame retardant is employed in an amount that alone would be insufficient to impart to said synthetic resin composition a flame resistance rating of V-O according to the modified U.L.-94 test and wherein said triphenylphosphine oxide is employed in an amount which enhances the flame resistance provided by the phosphorus-containing flame retardant.

21. A method according to claim 20 wherein the amount of said phosphorus-containing flame retardant employed is in the range of about 15 to about 65 parts by weight per hundred parts by weight of polyolefin and the amount of triphenylphosphine oxide employed is in the range of about 2 to about 10 parts by weight per hundred parts by weight of polyolefin.

22. A method according to claim 21 wherein the amount of phosphorus-containing flame retardant employed is in the range of about 22.5 to about 40 php and the amount of triphenylphosphine oxide employed is in the range of about 5 to 7.5 php.

23. A method according to claim 22 wherein the phosphorus-containing flame retardant is prepared from orthophosphoric acid, phosphorus pentoxide, melamine, and at least one of said polyols.

24. A method according to claim 22 wherein the phosphorus-containing flame retardant is prepared from condensed phosphoric acid, melamine, and at least one of said polyols.

* * * * *